(12) United States Patent
Hammock

(10) Patent No.: US 11,046,241 B2
(45) Date of Patent: Jun. 29, 2021

(54) DECELERATION-TRIGGERED AUTOMATIC BRAKE INDICATION

(71) Applicant: Jefferey B Hammock, Madison, AL (US)

(72) Inventor: Jefferey B Hammock, Madison, AL (US)

( * ) Notice: Subject to any disclaimer, the term of this patent is extended or adjusted under 35 U.S.C. 154(b) by 179 days.

(21) Appl. No.: 16/262,398

(22) Filed: Jan. 30, 2019

(65) Prior Publication Data

US 2020/0122633 A1    Apr. 23, 2020

Related U.S. Application Data

(63) Continuation-in-part of application No. 15/647,208, filed on Jul. 11, 2017, now Pat. No. 10,315,559.

(60) Provisional application No. 62/360,863, filed on Jul. 11, 2016, provisional application No. 62/360,867, filed on Jul. 11, 2016, provisional application No. 62/624,095, filed on Jan. 30, 2018.

(51) Int. Cl.
| | | |
|---|---|---|
| *G06F 7/70* | (2006.01) | |
| *B60Q 1/50* | (2006.01) | |
| *G05B 19/042* | (2006.01) | |
| *B60Q 1/00* | (2006.01) | |
| *G01P 15/18* | (2013.01) | |
| *G01S 19/52* | (2010.01) | |
| *B62J 6/01* | (2020.01) | |
| *B62J 6/04* | (2020.01) | |
| *B60Q 1/44* | (2006.01) | |

(52) U.S. Cl.
CPC ............ *B60Q 1/50* (2013.01); *B60Q 1/0094* (2013.01); *B62J 6/01* (2020.02); *G01P 15/18* (2013.01); *G01S 19/52* (2013.01); *G05B 19/042* (2013.01); *B60Q 1/44* (2013.01); *B62J 6/04* (2013.01); *G05B 2219/25252* (2013.01)

(58) Field of Classification Search
None
See application file for complete search history.

(56) References Cited

U.S. PATENT DOCUMENTS

| | | | | |
|---|---|---|---|---|
| 5,404,130 A * | 4/1995 | Lee | ......... | B60Q 1/445 340/436 |
| 5,442,333 A * | 8/1995 | Bailey | ........ | B60Q 1/445 340/467 |
| 6,357,836 B1 * | 3/2002 | Schmitt | ......... | B60T 8/1766 303/113.5 |
| 7,932,820 B2 * | 4/2011 | Hurwitz | ........ | B60Q 1/2676 340/479 |
| 9,834,215 B2 * | 12/2017 | Braunberger | ......... | B60W 10/22 |
| 2005/0134439 A1 * | 6/2005 | Moore | ........ | A42B 3/0453 340/432 |

(Continued)

*Primary Examiner* — Julie B Lieu
(74) *Attorney, Agent, or Firm* — Patent Grove, LLC; Tomas Friend

(57) ABSTRACT

Automatic deceleration indication involves a deceleration sensor unit that senses deceleration and a microprocessor that causes deceleration warning light illumination when a sensed deceleration exceeds a threshold value. The deceleration sensor unit may include a solid state accelerometer acting as a deceleration sensor, a GPS module acting as a deceleration sensor, or both. The deceleration warning light my be a brake light, a separate warning light attached to a vehicle, or worn by an operator or passenger of bicycle, scooter, or motorcycle.

17 Claims, 6 Drawing Sheets

(56) References Cited

U.S. PATENT DOCUMENTS

| | | | | |
|---|---|---|---|---|
| 2010/0066528 | A1* | 3/2010 | Kim | B60Q 1/447 340/479 |
| 2012/0007727 | A1* | 1/2012 | Lin | B60Q 1/44 340/432 |
| 2014/0297104 | A1* | 10/2014 | Braunberger | G08G 1/162 701/36 |
| 2014/0354422 | A1* | 12/2014 | Olson | B60Q 1/445 340/465 |
| 2016/0094964 | A1* | 3/2016 | Barfield, Jr. | G08B 25/016 455/404.2 |
| 2016/0241554 | A1* | 8/2016 | Zizi | G06K 9/00885 |
| 2018/0108256 | A1* | 4/2018 | Braunberger | B60W 30/143 |

* cited by examiner

DECELERATION-TRIGGERED AUTOMATIC BRAKE INDICATION

RELATED APPLICATIONS

This application claims priority under 35 U.S.C. 119(e) to provisional application 62/624,095 filed 30 Jan. 2018. This application is a Continuation-in-Part of, and claims priority under 35 U.S.C. 120 to, application U.S. Ser. No. 15/647,208 filed 11 Jul. 2017, which claims priority under 35 U.S.C. 119(e) to U.S. 62/360,867 and to U.S. provisional application 62/360,863, both filed 11 Jul. 2016.

BACKGROUND OF THE INVENTION

Field of the Invention

The present invention relates generally to apparatus, methods, and systems for detecting and signaling sudden deceleration of a vehicle independent of any action by an operator of the vehicle or a brake system. More specifically, the invention relates to apparatus, methods, and systems that use Global Positioning System (GPS) data, alone or in combination with an accelerometer, to detect and indicate deceleration.

Discussion of Related Art

U.S. Pat. No. 6,225,896 describes an emergency deceleration warning apparatus with a deceleration sensor comprising a conductive liquid inside a hollow tube that forms an electric contact between two conductive contacts at one end of the tube upon a deceleration of 0.2 G or more.

U.S. Pat. No. 6,249,219 describes a severe braking warning system comprising a solid-state accelerometer and a microprocessor that continuously monitors vehicle acceleration to indicate deceleration caused by braking and using power drawn directly from the vehicle power system.

U.S. Pat. No. 6,411,204 describes an anti-collision safety light system for a vehicle comprising a solid state accelerometer and a microprocessor that activates a brake light when deceleration beyond a threshold value is measured. The system is powered by the vehicle's power system.

U.S. Pat. No. 6,417,767 describes a system for indicating rapid deceleration using two acceleration sensors. The axis of one accelerometer is substantially aligned with a direction of vehicle motion and another axis of an accelerometer is aligned with gravity when the vehicle is level. A controller accounts for gravitational effects and activates a warning indicator when a mathematical combination of the two measured accelerations exceeds a threshold value, or when the first acceleration exceeds a mathematical combination of the second acceleration and a threshold value indicating an urgent deceleration.

U.S. Pat. No. 8,482,397 describes a deceleration-activated brake light system comprising a speed sensor that detects vehicle decelerating and coasting, a brake sensor switch that determines if deceleration is caused by application of a brake pedal, a throttle position sensor that determines whether a gas pedal is pressed, an engine/exhaust brake switch that determines if an engine/exhaust brake is engaged, and a microcontroller that activates the brake light system of the vehicle based upon inputs from the sensors.

U.S. Pat. No. 9,327,642 describes a self-powered deceleration-triggered stop lamp for installation into a light socket of an automobile, truck, or other vehicle. A computer-based controller coupled to the deceleration sensor compares a measured deceleration value to a pre-defined threshold and issues a signal to illuminate LEDs if the measured deceleration value is greater than or equal to the pre-defined threshold. The stop lamp does not interfere with the normal operation of other lighting components such as tail, brake, or turn indication lights. An energy storage component is coupled to the LEDs so they can be powered independently from the vehicle's brake circuitry. A charging circuit allows the energy storage component to be recharged by the vehicle's electrical system when the brakes are applied.

US 2002/0133282 describes a brake light array that illuminates sequentially when a velocity measuring device detects a change in velocity independent of the braking system. The publication indicates that the velocity measuring device can be a speedometer, an accelerometer, an odometer, an anti-lock braking system (ABS), or a global positioning system (GPS).

US 2005/0237172 describes a warning system housed in a license plate bracket that includes a self-contained power source, an accelerometer, and a microprocessor unit. When the system senses that the vehicle is decelerating at a rate greater than a threshold level, it illuminates warning lights provided on the license plate bracket.

US 2009/0261963 describes a vehicle deceleration warning system including an accelerometer, means for measuring the speed of the vehicle, a control unit, a brake light relay, and a brake light. The control unit activates the brake light relay to illuminate a brake light if a measurement taken by the accelerometer indicates a deceleration above a threshold value or if the system measures a vehicle speed below a predetermined threshold.

US 2014/0354422 describes a system for detecting vehicle deceleration having a processing unit that samples data from an accelerometer. Based on that data, a deceleration indicator is activated if the vehicle is decelerating in excess of a threshold deceleration. The accelerometer may be a GPS device.

US 2016/0046231 describes a vehicle deceleration warning system comprising a primary brake pedal sensor, a secondary brake control sensor, a transmission sensor, a wheel speed sensor, a visual indicator, and a control unit which receives the sensor signals and controls activation of the indicator. The system controls a brake light or an indicator light as a function of vehicle deceleration and as a function of normal service brake pedal or secondary brake operation. Acceleration is measured based on wheel speed over time. Consequently, any event in which wheel speed does not change with vehicle speed could result in an erroneous signal. For example, when the wheels slide rather than rotate, it is impossible to obtain an accurate measurement of deceleration. The same is true when one or more of the wheels spin.

WO 2009/049332 describes an early warning brake system with an accelerometer that constantly measures deceleration and stores maximum deceleration values in a computer. The system calibrates itself to the braking force of the vehicle, and optionally to the driver, to provide suitable indication of an emergency braking event and to compensate for the measured braking power when the car is traveling on a sloped surface. The system is powered when the brake is applied and does not measure, or warn of, deceleration in the absence of braking.

WO 2014/152262 describes a brake lamp module for a vehicle comprising a housing carrying a lamp, an accelerometer, and a control unit. The control unit is configured to provide power to illuminate the lamp in response to rapid deceleration independently from actuation of the brake pedal by the operator. A selected acceleration threshold is associated with a hazard event such as a vehicle collision or loss control. Abrupt changes in vertical acceleration are interpreted as a hazard events and cause brake light illumination even when the vehicle is not decelerating in the direction of motion. Rather than filtering out erroneously measured deceleration values caused by rough road surfaces such as potholes or rumble strips, driving over such surfaces is interpreted as a hazard event and provides an indication of deceleration in the direction of motion.

Despite the above mentioned advances in deceleration indicating technologies, various drawbacks to these advances may be responsible for the small number products that have come into use in the transportation, sporting, and recreational industries. For example, some systems do not warn of deceleration when a vehicle's electrical system fails or may interfere with normal brake signaling if the deceleration indicating circuitry fails. Some require that an accelerometer be installed within strict tolerances of required orientations. A deceleration sensor requiring orientation-specific mounting can produce erroneous deceleration measurements when a vehicle is traveling on an incline or a decline because the direction of gravity changes with respect to set orientation of the sensor. Some systems like the license plate system have illumination or indication of deceleration displayed at a location so low on a vehicle, so as to limit visibility. Depending on the power configuration, battery life may require frequent battery replacement and depletion while driving could render a system inoperable without the driver being aware of the failure.

Vehicle motion on rough road surfaces, use of inadequate or sport-tuned suspension, traveling on incline/decline angle, and centrifugal forces experienced during turns are causes of false or erroneous illuminations in many existing deceleration indicating systems and methods. A system using typical three axis accelerometers must compensate for erroneous deceleration measurements caused by road conditions such as potholes or rough surfaces, or hard turns that, in turn, lead to frequent erroneous indications.

Automatic deceleration indication using a 3-axis accelerometer to measure g-forces of deceleration and illuminating a brake light when measured deceleration exceeds a threshold has been described in US 2018/0009372 A1. The compensation for gravitational and other forces causing erroneous deceleration indication described is sufficient for most passenger vehicles and trucks on typical roadways, but may not be ideal for all vehicle types. A different solution may be advantageous for certain recreational and fishing boats, off-road vehicles (ATVs, UTVs), snowmobiles, personal watercraft, and bicycles, in part, because these vehicles exhibit motion dynamics and g-forces that are more intense than passenger vehicles on roadways. For example, trucks such as waste/garbage trucks that make frequent stops exhibit higher pitch angles than passenger vehicles due to the aggressive application of an electromagnetic retarder. The greater pitch can complicate deceleration measurements by three axis accelerometer because of the contribution of gravity suddenly changes angle.

BRIEF SUMMARY OF THE INVENTION

The presently described invention fills needs in the art for solutions to problems associated with reliably detecting and indicating deceleration of vehicles and watercraft of various types, especially those that are moving over rough surfaces, moving with bipedal motion, and/or moving with relatively large changes in pitch and/or lateral accelerations. The invention, however, is applicable to passenger vehicles, trucks, tractors, and trailers as well. An accelerometer and/or a GPS system are used as deceleration detectors in an automatic deceleration indicating system and/or method that reduces or eliminates drawbacks and/or otherwise provides improvements over existing automatic deceleration indicating systems.

The invention may be used for modifying an existing vehicle brake indiction system or it may be included in an original vehicle brake indication system so that the brake light activates when the vehicle experiences deceleration exceeding a threshold value whether the brakes are applied or not. The invention may be configured to operate without any or without constant consumption of power from the vehicle.

The invention provides for indication of deceleration exceeding a threshold value with improved removal of erroneous activation resulting from rough road surfaces, potholes, hard turns, road vibration, up hill and down hill grades, vertical acceleration and other causes of measured accelerations not related to vehicle deceleration. Improved avoidance of erroneous deceleration indication is accomplished by the processing of accelerometer data, the use of GPS data in place of accelerometer data, or by using both accelerometer data and GPS data to detect deceleration.

The invention may be embodied as a completely portable deceleration-activated lighting system and method that operates independently of any vehicle power supply and may comprise a portable deceleration-activated lighting system comprising wearable illumination wirelessly coupled to a vehicle mounted deceleration sensor.

The invention may comprise a transmitter-receiver system in which original vehicle lighting and one, two, or more deceleration indicating system lights illuminate simultaneously in response to braking and deceleration.

These and other aspects and advantages of the invention, and improvements relative to the state the art are described in more detail herein below.

Advantages of the present invention arise, at least in part, from sensing that may involve the use of an accelerometer alone, a GPS-based deceleration indicating method and apparatus alone, or a combination of these to provide an apparatus, system and/or method providing redundancy with respect to deceleration measurement and/or detection. Data from an accelerometer used as a deceleration sensor is processed to compensate for vehicle orientation, transient g-forces from vehicle motion other than deceleration, and g-forces from rough terrain or water. An improved algorithm particularly suited to these types of vehicles is used to automatically indicate deceleration, for example by illuminating a brake light, that a vehicle is decelerating. This is particularly useful for improving the safety of slower moving electronic-mobility vehicles such as scooters, bicycles, and Segways® that use regenerative braking.

National Marine Electronics Association (NMEA) sentences are the output of a GPS Module. Time, position, and velocity data are included in the sentence and can be extracted but deceleration is not included in the NMEA sentence. As part of the present invention, data from a GPS receiver is processed to calculate deceleration which, advantageously, is independent of any forces of acceleration associated with vibrations, traversal of rough surfaces, gravity, and turns. For example, boats impact on waves that exert forces in different directions and cause very rapid changes in velocity but no sustained deceleration. Off road vehicles, including snowmobiles, traverse rough terrain that can cause them to pitch, roll, and/or yaw in various directions and complicate deceleration measurements based on accelerometer measurements in similar ways. Bicycle pedaling introduces roll from side to side and short duration forward accelerations and decelerations, which are difficult to filter out in g-force accelerometer based deceleration sensors. The use of a deceleration sensor processing GPS data, alone or in combination with an accelerometer overcomes certain limitations of purely accelerometer based methods and provides for improved deceleration detection and measurement and reduced false positive indication in particularly high motion dynamics environments.

BRIEF DESCRIPTION OF THE DRAWINGS

A more complete understanding of the present invention is derived by referring to the detailed description and claims when considered in connection with the figures, wherein like reference numbers refer to similar items throughout the figures and in which:

DETAILED DESCRIPTION OF THE INVENTION

Figure 1:
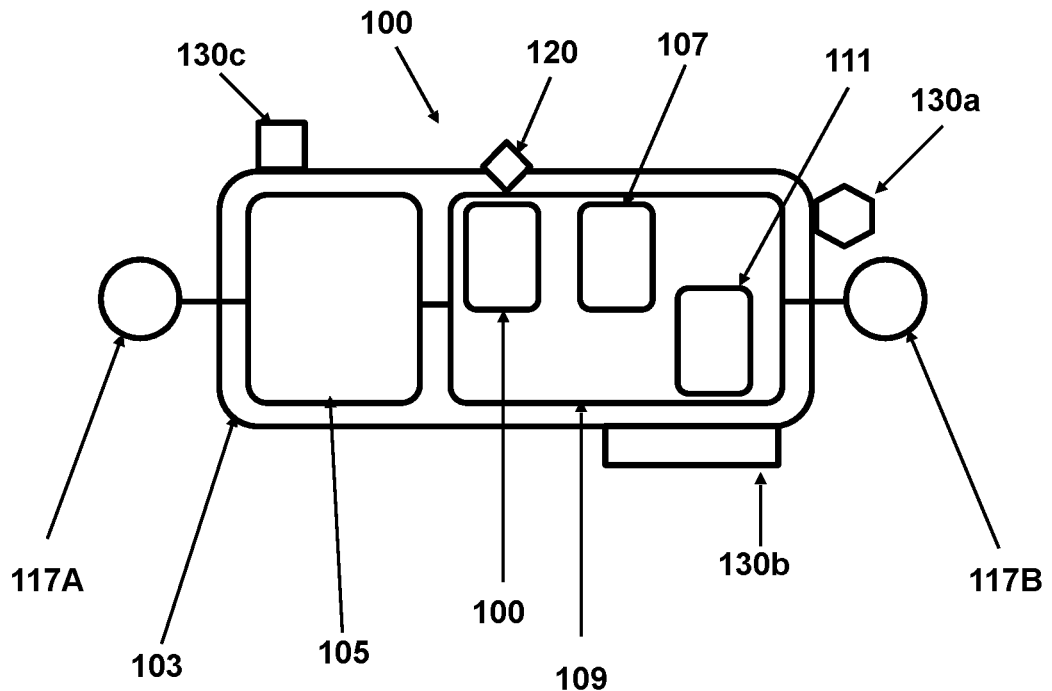
FIG. 1 illustrates a general structure of an exemplary sensor and control module.

As used herein, a brake lamp may comprise any number of LEDs, incandescent, and/or other types of light bulbs. A brake lamp may comprise a combination of one or more tail lights with one or more brake lights. Brake lights may also be referred to as stop lamps. A brake lamp may also be a high mount or center high mount stop lamp, which may also be referred to as a third brake light. A brake lamp may be present in a powered vehicle such as an automobile, motorcycle, truck, snowmobile, or watercraft or a brake lamp may be present in a trailer designed to be pulled by and electrically connected to an electrical system of a motorized vehicle.

As used herein, a "portable sensor unit" is a sensor unit that designed to be reversibly and temporarily mounted to a vehicle in such a way that the acceleration forces experienced by the vehicle are also experienced by the sensor unit. A portable sensor unit does not require an electrical connection to a vehicle electrical system for power or operation.

As used herein, an accelerometer is a conventional three-axis solid state accelerometer, a micro machined multi-axis solid state accelerometer or an equivalent accelerometer that measures acceleration in three, preferably orthogonal, axes.

The words "microprocessor," "microcontroller," "computer," and "controller" are used herein to refer to any of a the computer-based processors available such as a field programmable gated array (FPGA), an application specific integrated chip (ASIC), a programmable circuit board (PCB), a multiple chip module (MCM), an integrated chip (IC) device, or any combinations thereof. Control logic (i.e., computer programs) are stored in the main memory and/or secondary memory. Control logic, when executed, enables the computer system to perform certain functions as described herein and may advantageously be implemented as one or more modules, which may be configured to reside on the processor memory and execute on the one or more processors. The modules include, but are not limited to, software or hardware components that perform certain tasks.

A "power supply" or "power source" in reference to the present invention is an energy storage device that is connectable to the vehicle's battery and electrical system and provides power sufficient for normal operation. In a preferred embodiment, a rechargeable battery. The power supply may comprise circuitry allowing it to be recharged in place. Additionally or alternatively, the power supply may be removed from a sensor unit or illumination unit for recharging remotely to the unit from which it is removed.

Fixing the position of an apparatus relative to a vehicle, or portion of a vehicle, may involve means for attaching the apparatus, or a support frame of the apparatus, to a fixed element of the vehicle. Attaching may involve the use of, for example, glue, welds, bolts, screws, clamps, double-sided adhesive strips, or magnets.

As used herein, a "bypass circuit" in a device is a circuit that functions independently from other circuits in the apparatus to convey electrical energy from one electrical connector of the device to another electrical connector of the device. Other circuits may be connected to the bypass circuit in such a way that the bypass circuit functions whether any or all other circuits of the device are functional or not.

As used herein, a "threshold value" with respect to acceleration values is a predetermined value for acceleration measured by a deceleration sensor for a time t. A threshold acceleration value may be for a single axis or a combination of two or more axes. A threshold acceleration value may be constant or it may vary according to a predetermined function of a measured acceleration value. For example, a threshold acceleration value in one axis may be a function of a measured acceleration value for a different axis. Measured and threshold acceleration values at a time t for different axes may be mathematically combined into measured and threshold acceleration vectors at time t.

Acceleration may be positive or negative. Negative acceleration is used herein as equivalent to deceleration. Acceleration is measured many times "t" per second in three, preferably orthogonal, axes. Measured acceleration values in three different axes may be combined into a vector comprising the three measured components. A predefined threshold value required for triggering a signal to activate an illumination unit may be constant or preferably varies in a predefined manner depending on the relative magnitudes of the measured accelerations along different axes. In other words, the threshold value for the vector derived from the combination of three measured values may vary in a predefined way depending on the relative values for one or more of the three measured acceleration values. For example, the threshold value for a time t may decrease with a measured negative acceleration at time t in the direction of gravity and/or the threshold value for a time t may increase or decrease relative to a centrifugal force encountered when the vehicle is turning.

The terms "reversibly mounting," "reversible attachment," "temporarily mounting," to a vehicle are used herein to describe easily removable but secure attachment. Means for accomplishing reversible attachment or reversibly mounting or temporarily mounting to a vehicle may comprise a first component that may or may not remain on the vehicle and a second component on an article to be reversibly or temporarily attached to first component, without the use of tools, such as a quick release plate, toggle clamp, quick release clamp, and quick release buckle systems, quick release magnetic mount, quick release programmable magnets mount, and the like. Reversible or temporary attachment may also include single component attachment means on the article to be attached such as as toggle clamps, quick release clamps, quick release buckles. With respect to an illumination unit according to the invention, means of reversible attachment to a vehicle operator or vehicle passenger may include a helmet, an article of clothing such as a coat, vest, jacket, or shirt, or an accessory item such as a belt, a headband, gloves, or hat.

Global Positioning System (GPS) is used herein with reference to a satellite-based radionavigation system that provides geolocation and time information to a GPS receiver anywhere on or near the Earth where there is an unobstructed line of sight to four or more GPS satellites. Time, position, and velocity data are sent to the receiver and can be extracted but acceleration data is not included and must be otherwise measured or calculated in accordance with the invention. Currently available GPS module chipsets provide positional accuracies of 3 meters or better and velocity accuracy of 0.1 meters/second with an update rate of 1 to 10 Hz.

With reference to FIG. 1, a general structure of a sensor and control apparatus 100 according to the invention comprises a support frame 103 housing a circuit board 109, a power source 105, a microcontroller 107, a deceleration sensor 111, and power circuitry 115 (FIG. 2) adapted for receiving DC power from a vehicle electrical system to recharge the power source 105. The apparatus 100 comprises an electrical connector 117a suitable for connection to a stop lamp connector having contacts for coupling power from the automobile's power system to a stop lamp and an electrical connector 117b, suitable for connection to a stop lamp having contacts for coupling power from the automobile's power system.

Electrical connectors 117a and 117b allow the sensor control apparatus to be quickly and conveniently installed by disconnecting an electronic coupling between a stop lamp and a vehicle's electrical system, connecting electrical connector 117b to the stop lamp, and connecting electrical connector 117a to the vehicle's electrical system. For example, the connection between a vehicle's electrical system and a brake lamp is often in the from of a waterproof socket connector comprising a male side and a female side which, when connected, form a waterproof box with a wire pigtail connecting to the electrical system. In some embodiments, electrical connectors 117a and 117b are configured to connect to male and female sides of a vehicle's existing brake lamp connector or visa versa. Automotive brake lamp connectors, including sockets and harnesses are well known in the automotive industry and will not be described further here.

It is understood that a sensor and control apparatus 100 may alternatively be equipped to a vehicle during manufacture without first disconnecting a vehicle's electrical system from a brake lamp. An advantage of incorporating electrical connectors of this type into the deceleration sensor and control apparatus 100 is that apparatus may be adapted to function in most types of automobiles, trucks, motorcycles, boats, and other powered vehicles. Another advantage is that the apparatus may be adapted to convert the brake light of a trailer in similar fashion to warn of deceleration not caused by braking. For such applications, the apparatus may additionally comprise a quick release coupling between electrical connection 117a and the support frame 103 so that, in the event of uncoupling between a trailer and a towing vehicle, power from the power source 105 will continue to be available to the trailer brake lamp for illumination.

The power source 105 preferably comprises one or more rechargeable batteries. Deceleration sensor 111 may comprise a three-axis accelerometer, a GPS receiver module, or both. A three-axis accelerometer may be, for example, a conventional three-axis solid state accelerometer or a micro machined multi-axis solid state accelerometer. The accelerometer is configured to sample all three axes at all times t so that no calibration step is required for initial install or during operation.

A GPS receiver may comprise a printed circuit board comprising a microprocessor to convert sequential position and time data to velocity and acceleration. Additionally or alternatively, position and time data from the GPS receiver may be processed by a microprocessor of the microcontroller 107 to calculate velocity and acceleration. A GPS module may comprise an antenna and/or be connected to an external antenna. For example, if a GPS receiver module were positioned within a vehicle or a housing or frame in a way that might block reception from GPS satellites, a GPS antenna may be connected to the GPS module and placed in a location with unimpaired reception.

The sensor and controller apparatus 100 is configured to be connected to the brake lamp and the vehicle's electric system through a standard connector at electrical connectors 117a and 117b. In cases where the brake lamp comprises both a tail light and a brake light, the sensor and control apparatus 100 may be configured to receive power from the vehicle delivered for the activation of the tail light as well as power delivered for the activation of the brake light.

Figure 2:
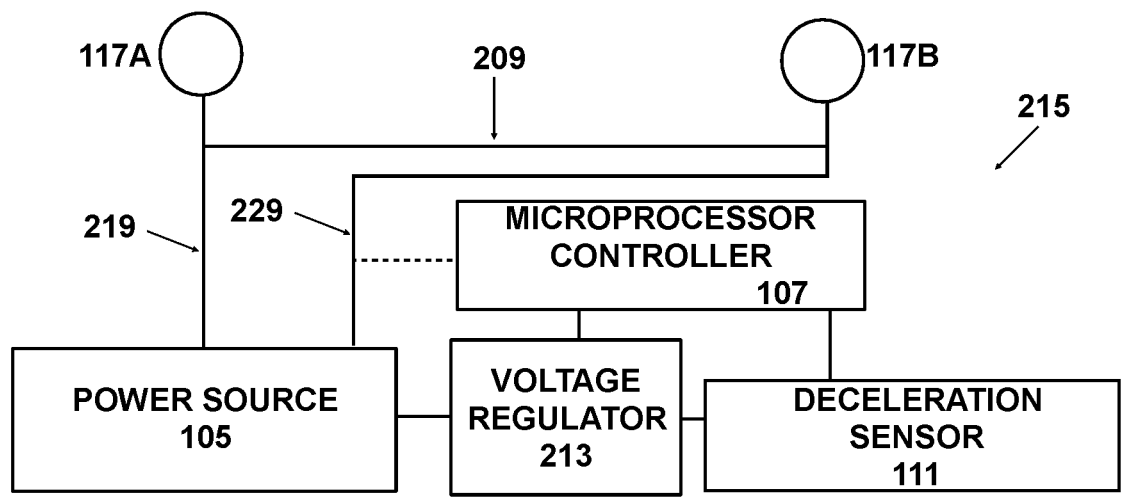
FIG. 2 presents a diagram of an embodiment of a power circuit.

FIG. 2 shows a diagram of an embodiment of a power circuit 215 for a sensor and control apparatus 100. A by-pass circuit 209 is configured to convey electrical signals indicating braking from the electrical connector 117a through the apparatus to electrical connection 117b without interruption when the brakes are applied. An advantage of this feature is that normal brake light operation is not prevented in the event of a failure elsewhere in the electrical system of the apparatus. A charging circuit 219 is configured to draw a portion of electrical current from the bypass circuit 209 to charge the power source 105 without interfering with the normal operation of the brake lights. Additionally or alternatively, the charging circuit 219 may be configured to divert power from the bypass circuit to power source 105 when the tail lights are illuminated. In another embodiment, the apparatus 100 may additionally or alternatively comprise an energy harvesting device that converts kinetic energy into electricity and is electrically coupled to power source 105 to provide energy for recharging. Such an energy harvesting device may use the movement of a magnet in an electromagnetic generator to generate power for recharging or a piezoelectric device stimulated to vibrate by road and/or engine vibrations. Additionally or alternatively, a thermoelectric generator comprising a junction of two dissimilar materials in the presence of a thermal gradient may be used to provide power for regeneration.

Power source 105 powers microcontroller 107 and deceleration sensor 111, preferably through one or more voltage regulator(s) 213. Power source 105 is also connected to an illumination circuit 229 to provide electrical power to the brake lamp through electrical connector 177b when instructed to do so by the microprocessor controller 107 (dashed line). This may be accomplished, for example, by the closing of a switch in the illumination circuit 229 by the controller in response to a measured deceleration at or above a threshold value.

The deceleration sensor 111 produces an output that is transmitted to the microprocessor controller 107. The deceleration sensor 111 preferably comprises a three-axis accelerometer that measures acceleration in each of three orthogonal axes for each time t, a GPS receiver, or both. For a deceleration sensor 111 comprising an accelerometer, the sensor may additionally comprise a microprocessor configured to convert measured acceleration values into a combined acceleration vector. Additionally or alternatively, the microprocessor controller 107 may be configured to convert measured acceleration values into a combined acceleration vector. For a deceleration sensor 111 comprising an accelerometer, and a GPS receiver, the microprocessor controller 107 may be configured to average or fuse deceleration data from the accelerometer and deceleration data calculated from GPS based deceleration sensor for a more accurate and/or more robust deceleration measurement.

For embodiments comprising an accelerometer, microprocessor controller 107 is preferably configured to analyze the measured acceleration vector at each time t to assess the relative contributions of axes in the direction of travel, the direction of gravity, and a direction orthogonal to gravity and the direction of travel. The physical axes of acceleration measurement need not be aligned along the horizontal or vertical because the microprocessor controller 107 comprises software configured to detect the orientation of the gravity force vector with respect to the 3-axes of the accelerometer independent of its orientation. The software is also configured to establish the direction of forward motion and orthogonal to forward motion based on measured acceleration profiles characteristic of forward and lateral motion. The microprocessor also comprises software that selects a trigger threshold value for brake light activation depending on incline and decline of a road surface and depending on a centrifugal acceleration force in the plane of, and perpendicular to, the direction of motion caused by hard turns. The threshold value required for triggering to activate the illumination circuit is derived from the combination of measured accelerometer values in three orthogonal axes and the trigger value varies in a predefined way depending on the relative measured values for the three axes. Incline and decline travel causes the measured acceleration value for a time t to increase or decrease with respect to the direction of gravity. The threshold value for a time t may increase or decrease relative to travel uphill or downhill, respectively. Centrifugal force may cause an increase in the measured acceleration at time t in an axis perpendicular to forward motion. The threshold value for a time t may increase or decrease relative to a centrifugal force encountered when the vehicle is turning. Acceleration values from all three axes are used to improve the fidelity of the threshold calculation and to avoid false positives due to rough road surfaces, vehicle vibration, inclined road surface and curves in the roadway.

Figure 3:
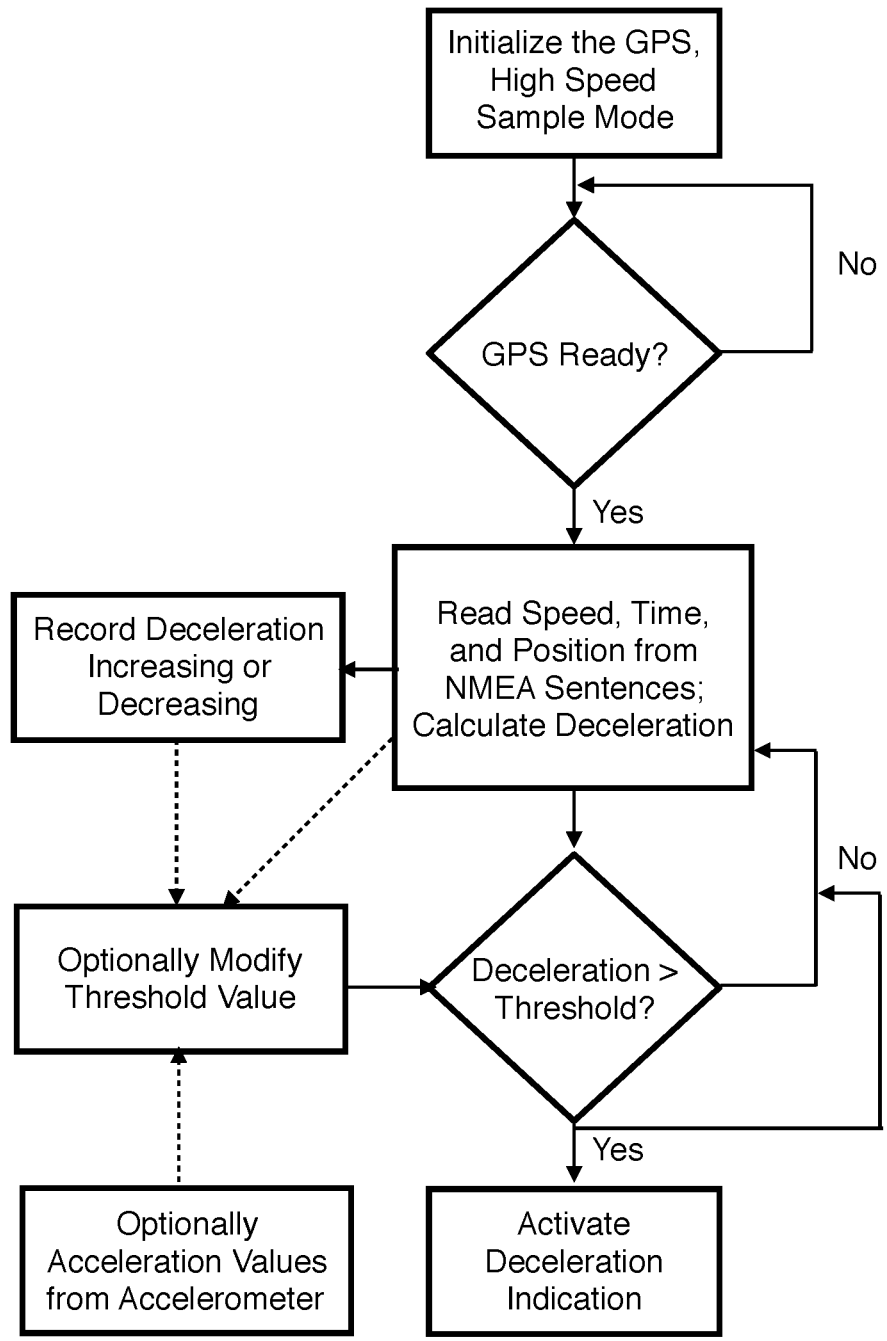
FIG. 3 is a flow chart depicting logic that may be implemented on a microprocessor to control the illumination of a brake light in response to GPS signals.

For embodiments comprising a GPS receiver, microprocessor controller 107 is preferably configured to use time and position data at each time t to calculate timed velocity and timed acceleration values. FIG. 3 shows an example logic that may be implemented on the microprocessor 107 to control the illumination of a brake light in response to GPS signals alone. Timed deceleration may be calculated from GPS time and position data, timed GPS velocity data, or both. If the timed deceleration value is greater than a threshold value, the microprocessor signals for the deceleration to be indicated, for example by the illumination of a LED. Illumination is preferably maintained for a minimum time before illumination is automatically terminated when calculated deceleration falls below the threshold value. Compared to embodiments comprising only an accelerometer, this process eliminates the need to determine a direction of the vehicle, the direction of gravity, and the direction of accelerations because these may be calculated from the position data from the GPS receiver.

The threshold value may optionally be changed using data from the GPS. For example, changes in position indicate whether the vehicle is moving up hill or down hill and this information may be used to change the threshold value since following vehicles traveling down hill may require longer distances to stop or slow to a speed low enough to avoid collision. For an embodiment combining a GPS based deceleration sensor and a solid state accelerometer based deceleration sensor, acceleration data from either or both may be used to modify the threshold value and deceleration data from the two instruments may be combined to produce a fused deceleration value for comparison against the threshold value.

An advantage of a system combining an accelerometer and a GPS module, as separate deceleration sensors is that the accelerometer will continue to operate when direct line of sight with GPS satellites is not available as is the case in tunnels, under elevated roadways, and when line of sight is obstructed by other physical barriers. For embodiments comprising an accelerometer and a GPS receiver, the microcontroller may be configured to compare deceleration values derived from the two types of deceleration sensors when both are active and select, for example, the higher deceleration value, the lower deceleration value, an average deceleration value, or a weighted average deceleration value for comparison to the threshold value. Comparison with GPS receiver derived deceleration values may be used to filter accelerometer derived deceleration data when acceleration forces exceeding a threshold force normal to the direction of motion are sensed by the accelerometer.

The microprocessor 107 may comprise software that selects a trigger threshold value for brake light activation depending on incline and decline of a road surface and depending on a centrifugal acceleration force in the plane of, and perpendicular to, the direction of motion caused by hard turns as measured by an accelerometer. The threshold value required for triggering the activation of the illumination circuit may be derived from a combination of measured accelerometer values in three orthogonal axes and the trigger value may vary in a predefined way depending on the relative measured values for the three axes. Incline and decline travel causes the measured acceleration value to increase or decrease with respect to the direction of gravity.

The microcontroller 107 is configured with control logic that, upon receipt of a timed output signal from the deceleration sensor 111, compares the measured deceleration value to a pre-programmed threshold defined to indicate whether the vehicle is decelerating at sufficiently high rate to initiate energizing the vehicle's brake lamp connected at electrical connector 117b to indicate deceleration. If the measured deceleration value is determined to be greater than the pre-programmed threshold, control logic within the microcontroller 107 executes and a command signal to illuminate the brake lamp with power from the the power source 105 illumination circuit 229 for a set period of time. If the measured acceleration value is determined to be less than the pre-programmed threshold, control logic within the microprocessor controller 107 executes no command signal to illuminate the brake lamp.

Figure 4:
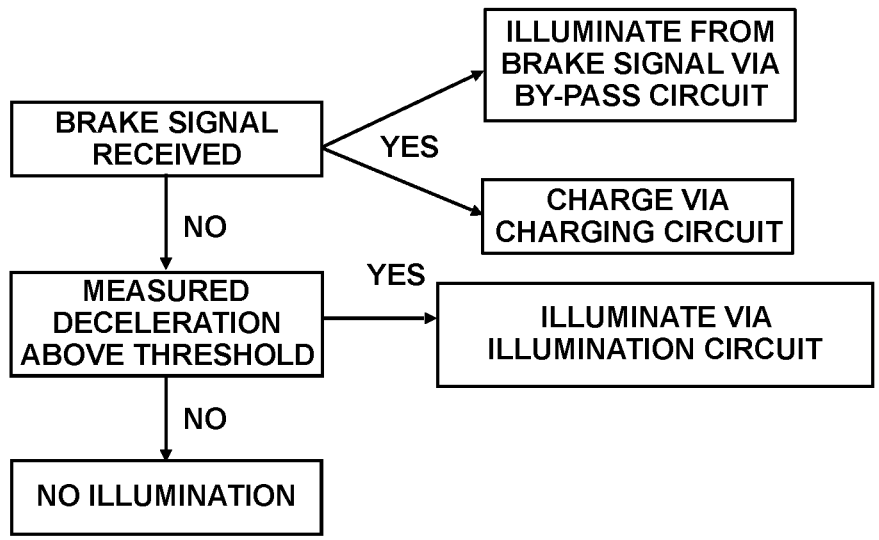
FIG. 4 is a state diagram for an embodiment of the invention.

FIG. 4 is a state diagram of one embodiment of the sensor and control apparatus 100. If a signal is received through electrical connector 117a that the brakes are applied at time t, the signal is automatically passes through to electrical connector 117b via the by-pass circuit 209 to illuminate the brake lamp. This electrical signal from the vehicle is conducted through by-pass circuit 209 whether the rest of the apparatus is functional or not and does not depend on the operation of a switch. When the by-pass circuit is active, a portion of the electrical energy passing through the by-pass circuit is diverted to the charging circuit 219 and delivered to power source 105 for recharging. Microprocessor controller 107 comprises control logic programmed in such a way that, when the by-pass circuit 209 is active, no command is issued to illuminate the brake lamp using power from power supply 105. The control logic is also programmed so that, when the by-pass circuit 209 is not active, i.e. the brakes are not being applied, a measured acceleration output from deceleration sensor 111 is received by the microcontroller 107 and compared to a threshold value. If the measured deceleration for time t meets or exceeds a threshold value, the logic causes a control signal to activate the illumination circuit 229 using energy from power supply 105 to provide energy to electrical connector 117b to illuminate the brake lamp. If the threshold is not met or exceeded, then the brake lamp is not illuminated.

The microprocessor 107 may be programmed with one or more threshold values that vary in a way to control activation of illumination circuit 229 to trigger illumination to indicate a deceleration. The threshold value(s) of the vector may vary depending on the relative values for one or more of the three values measured by an accelerometer serving as a deceleration sensor 111. For example, the threshold value for a time t may decrease with a measured negative acceleration at time t in the direction of gravity and/or the threshold value may increase with a measured positive acceleration at time t in an axis perpendicular to forward motion. One advantage of the feature of a variable threshold of this type is the ability to effectively filter the accelerometer data to remove road noise and other artifacts that can lead to signal that falsely indicate deceleration events. The variability of the threshold value may be embodied as a set of threshold values with a particular threshold value being selected at time t based upon a component of the acceleration vector for time t.

The microprocessor 107 may be programmed with one or more threshold values that vary in a way to control activation of illumination circuit 229 to trigger illumination to indicate a deceleration. The threshold value(s) of the vector may vary depending on the velocity at time t and/or changes in the direction of motion between time intervals, for example. For embodiments comprising both an accelerometer and a GPS sensor, threshold values for the two need not be identical and one or both may have threshold deceleration values that change with measured acceleration that is normal to the direction of forward motion.

The sensor and control apparatus 100 may comprise means 130a-c for fixing the position of the apparatus relative to a vehicle, or a portion of a vehicle. Additionally or alternatively, the sensor and control apparatus 100 may be fixed in place using fixing means provided separately from the apparatus 100. It is important that the movement of the vehicle be transmitted to the deceleration sensor 111. Installation of the apparatus comprises mounting the support frame 103 to the vehicle in such a way that the support frame 103 does not move relative to the vehicle in any direction. The apparatus 100 may comprise means for attaching the apparatus, or a support frame of the apparatus, to a fixed element of the vehicle. Such attachment means may include, for example, glue, welds, bolts, screws, clamps, magnets, double-sided adhesive strips, or any combination thereof. For embodiments comprising a deceleration sensor 111 having a GPS receiver, the receiver must be placed so that reception of signals from GPS satellites is not blocked but the GPS receiver need not be hard mounted to the vehicle and may be reversibly or permanently attached to the vehicle or an operator or passenger of the vehicle, for example on a helmet, jacket, or wristband.

Figure 5:
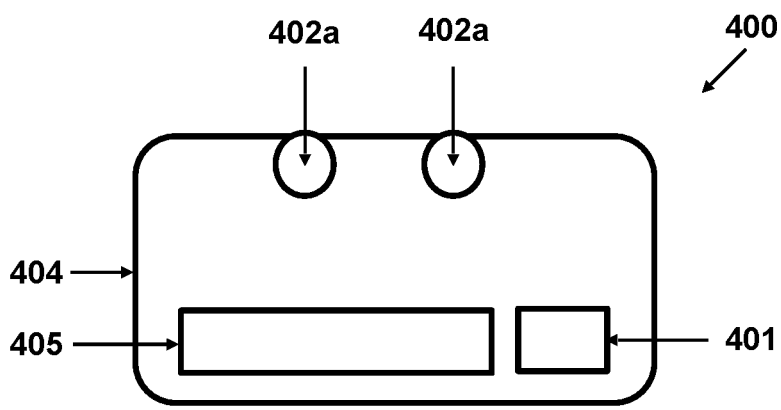
FIG. 5 is a schematic of a feedback display.

In addition to the embodiments described herein above, an embodiment of the sensor and controller apparatus may comprise a transmitter coupled to microprocessor controller 107 and power source 105 with controller 107 comprising control logic to activate the transmitter using power from power source 105 when it activates illumination circuit 229. This embodiment may be combined with a feedback display device 400 to form a sensor and control system (FIG. 5). The feedback display 400 comprises a support frame 404 holding a receiver 401 coupled to a visual indicator 402a in view of an operator of the vehicle to provide a feedback system that indicates to the vehicle operator that the sensor and control apparatus 100 is functioning. Visual indicator 402a may be a light source such as a light bulb or LED. In one embodiment, the feedback system may be configured to provide feedback to the operator indicating each time the brake lamp is illuminated using battery power through the illumination circuit 229. The feedback display 400 may be configured to be connected to and powered by the vehicle's electrical system. Another embodiment may additionally or alternatively comprise a power supply 405 to power the feedback device, including receiver 401 and the visual indicator 402a. Power supply 405 may be, for example, a power cell, battery, or rechargeable battery. The feedback display 400 may further comprise an audible feedback indicator 402b coupled to the receiver to produce an audible sound that indicates to the vehicle operator that the sensor and control apparatus 100 is functioning. In one embodiment, the feedback system may be configured to provide audible feedback to the operator each time the brake lamp is illuminated using battery power through the illumination circuit 229.

An embodiment of the sensor and control apparatus 100 may be configured for connection to a vehicle telematics system wherein signals are transmitted from the apparatus 100 and stored by the telematics system and/or transmitted as data by the telematics system. If a vehicle to which the sensor and control apparatus 100 is attached possesses a GPS receiver, position and time data from that GPS receiver may be transmitted to the microprocessor 107 by wireless or wired communication for conversion to timed deceleration data. An embodiment of a sensor and control apparatus 100 may additionally comprise a solid state accelerometer as a second deceleration sensor.

A method for installing an apparatus 100 to a vehicle may comprise mounting the apparatus to the vehicle; connecting electrical connectors 117a to an electrical connector of the vehicle leading to the vehicle's electrical system; and connecting electrical connector 117b to an electrical connector of a brake lamp. A method for installing a system including a feedback device 400 further includes mounting the feedback device in the cabin of the vehicle so that it is visible to an operator of the vehicle. If the feedback device 400 is configured to be powered by the vehicle's power supply, the method further includes connecting the feedback device to the vehicle's power supply.

Figure 6:
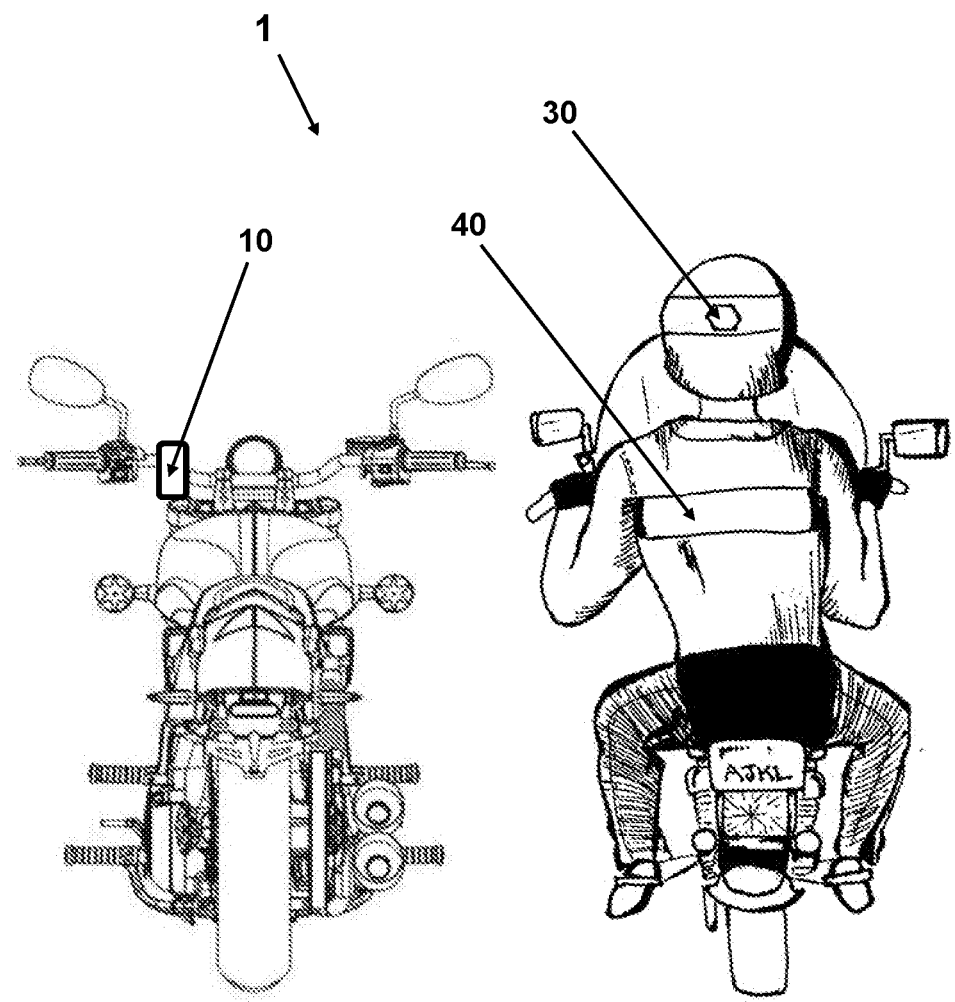
FIG. 6 is an illustration showing an embodiment of a portable deceleration warning system comprising a sensor unit for attachment to a vehicle and an illumination unit.
Figure 7:
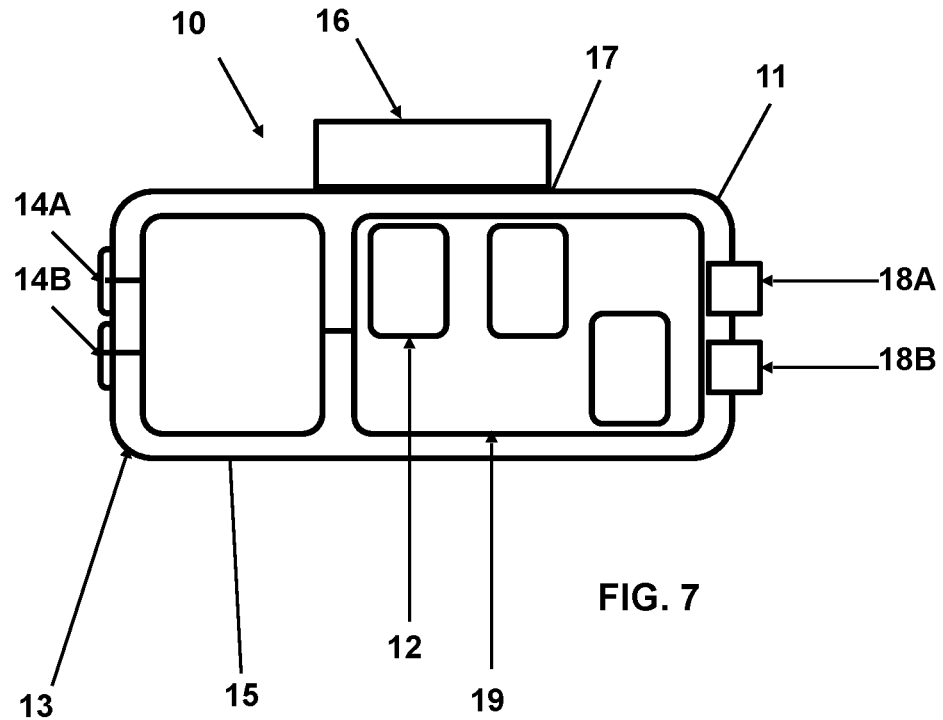
FIG. 7 is a front view an embodiment of a sensor unit.

With reference to FIGS. 6 and 7, a portable deceleration warning system 1 comprises a sensor unit 10 and at least one illumination unit 30, 40. The sensor unit 10 is configured for attachment to the vehicle such that acceleration experienced by the vehicle in any direction is also experienced by the sensor unit 10. This is an advantage over accelerometers worn by a vehicle operator because operator's body movements can buffer, or reduce the magnitude, of the measured acceleration compared to actual deceleration of the vehicle. Also, the orientation change introduced by turning the head or body introduces a coordinate system change for the acceleration measurement that can interfere with an accurate deceleration measurement.

For embodiments comprising a GPS module deceleration sensor 11, the sensor may be placed on the operator's body or the vehicle. An advantage of a GPS-based deceleration sensor is that the forces generated by an operator or a vehicle are not sensed via a hard mechanical mount. This allows a GPS-based deceleration sensor to be mounted anywhere on a vehicle, or on an operator riding a motorcycle, scooter, bicycle or the like.

For embodiments comprising both accelerometer and GPS-based deceleration sensors 11, placement on the vehicle is required unless the system is configured to transmit GPS data from a body worn GPS sensor to a vehicle mounted microprocessor 17. Temporary, reversible attachment to the vehicle may be accomplished by any reversible, temporary attachment means that locks the position of the sensor unit relative to the vehicle. In one embodiment, such attachment means may include quick release attachments between a housing on the sensor unit 10 and a quick release clamp on the vehicle. In another embodiment, such a quick release attachment may include a quick release clamp permanently attached to the sensor unit. In another embodiment, such a quick release attachment may include a magnetic mount or a programmable magnets mount. In yet another embodiment, reversible attachment may be achieved by applying sufficient pressure between a shaped housing on the sensor unit and a complementary shaped receptacle mounted to the vehicle. Pressure may be provided, for example by one or more elastic straps and/or tightening means on one or more straps with quick release buckles.

The vehicle in FIG. 6 is depicted as a motorcycle or motor scooter. A portable deceleration warning/indication system 1 may also be used with other vehicles such as personal watercraft, motorboats, jetboats, snowmobiles, bicycles, all terrain vehicles, and automobiles, for example. For vehicles or craft in which the operator is not visible, an illumination unit 30,40 is reversibly attached to the vehicle in a position visible to following vehicles or craft. An illumination unit 30,40 may be reversibly attached or worn by the the operator of the vehicle or, if a passenger is seated directly behind the operator, by passenger of the vehicle. As explained below, in some embodiments, an illumination unit may additionally or alternatively be reversibly attached to another vehicle or to or worn by an operator or passenger of another vehicle.

FIG. 7 is a front view of one embodiment of a sensor unit 10 comprising a frame or housing 13 with a means for reversible attachment 16 for temporarily mounting the sensor unit 10 to a vehicle. Support frame 13 holds a power supply 15 connected to a circuitboard 19, which comprises a deceleration sensor 11, a voltage regulator 12, a battery recharging circuit, and microprocessor or microcontroller 17.

The deceleration sensor 11 may comprise an accelerometer, a GPS receiver, or both. The power supply 15 preferably comprises one or more rechargeable batteries providing DC power to the voltage regulator 12, which provides power to the microprocessor 17 and the deceleration sensor 11. In a different embodiment, the sensor unit 10 may comprise more than one voltage regulator 12 providing different voltages to an accelerometer and a GPS receiver and, optionally, the microprocessor 17. The power supply 15 may alternatively or additionally comprise a fuel cell and the sensor unit 10 may optionally comprise a connector for connecting the power supply 15 to a charger or supplemental power supply such as an additional battery or battery pack or trickle charger that converts kinematic motion into electrical power. The power supply must be sufficient for independent operation of the sensor unit without drawing any power from the vehicle so that the sensor unit is truly portable and capable of use with, for example, bicycles lacking any electrical power.

The deceleration sensor 11 may be a conventional three-axis solid state accelerometer, a micro machined multi-axis solid state accelerometer or an equivalent accelerometer that measures acceleration in three, preferably orthogonal, axes. Acceleration values measured by the accelerometer for a time t in each of three different axes are combined by the microprocessor 17 into a vector comprising three components corresponding to the measured value. This process eliminates the need for accelerometer calibration. The microprocessor 17 may be programmed with one or more threshold values that vary in a predefined, or preprogrammed, way to control activation of the transmitter 14a to trigger illumination to indicate a deceleration and/or a crash. The threshold value(s) of the vector may vary depending on the relative values for one or more of the three measured values. For example, the threshold value for a time t may decrease with a measured negative acceleration at time t in the direction of gravity and/or the threshold value may increase with a measured positive acceleration at time t in an axis perpendicular to forward motion. One advantage of a variable threshold of this type is the ability to effectively filter the accelerometer data to remove road noise and other artifacts that can lead to signal that falsely indicate deceleration events.

The deceleration sensor 11 may be a GPS-based sensor comprising a GPS module, an antenna to receive signals from GPS satellites, and a microcontroller. A satellite navigation system with global coverage may be termed a global navigation satellite system (GNSS). Examples of GNSSs include the United States' Global Positioning System (GPS) and Russia's GLONASS, which have been publicly available since October 2018. China's BeiDou Navigation Satellite System (BDS) and the European Union's Galileo system are examples of GNSSs expected to be fully operational by 2020. The number of GPS satellites now available and higher GPS module update rates contribute to a time resolution that allows a GPS-based deceleration sensor of the present invention to sense changes in velocity with sampling rates sufficient for timely indication of deceleration, even for slow moving vehicles. One example of a suitable GPS-based sensor/receiver is FGPMMOPA6 made by GlobalTop Technology, Taiwan.

A first threshold may be used to trigger a deceleration warning and a second threshold may be used to trigger a crash or severe event warning in which illumination continues without further input from the operator. A signal in response to reaching and/or exceeding such a second threshold must be delivered quickly so that, in the event that the operator is thrown from the vehicle, the illumination unit(s) are activated before the vehicle and the operator are separated by a distance that prevents successful signal transmission. The illumination unit may be programmed, for example, to flash repeatedly until turned off by the operator or until power is exhausted. This feature provides the advantage of helping to visually locate the operator after an accident even when the operator is thrown far from the vehicle. Some embodiments of the invention may comprise, in addition to a primary light emitter, auxiliary illuminated fabric patches located onto the operator's apparel and/or helmet and positioned on the front, sides, and rear of the operator so that the auxiliary illuminated fabric patches illuminate only in response to said second signal. Triggering a crash warning may additionally or alternatively comprise a transmission to a mobile phone or other transmitting device to send a call for help, optionally including location data.

A transmitter 14a functionally coupled to the processor 17 transmits a signal when a threshold value for the acceleration vector at a time t is reached or exceeded. The embodiment shown in FIG. 7 comprises a functional indicator 18a and a feedback indicator 18b. Functional indicator 18a is powered by power source 15 and controlled by microprocessor 17 and is preferably a light that illuminates constantly or intermittently when the sensor unit is transmitting that signal to illuminate all receiver units. Functional indicator 18a may additionally or alternatively produce an audible sound to indicate that the sensor unit 10 is functioning.

The sensor unit 10 may include a feedback receiver 14b that receives a signal from a feedback transmitter on illumination unit 30,40 when a light emitter on the illumination unit is activated. Receipt of such a signal by feedback receiver 14b causes the processor 17 to activate feedback indicator 18b to indicate to the operator that the illumination unit is functioning and illuminating. Functional indicator 18a and feedback indicator 18b may be combined into a single unit embodied, for example, as a single indicator with two LEDs, one for each indicator function.

Transmitter 14a and receiver 14b preferably communicate via radio waves and may employ any standard wireless communication protocol such as addressed Bluetooth®, open Bluetooth®, Vehicle-to-Vehicle internet-based communication, or the like. One of skill in the art will appreciate that other forms of wireless communication such a infrared (IR) or microwave communication may also be used.

Figure 8:
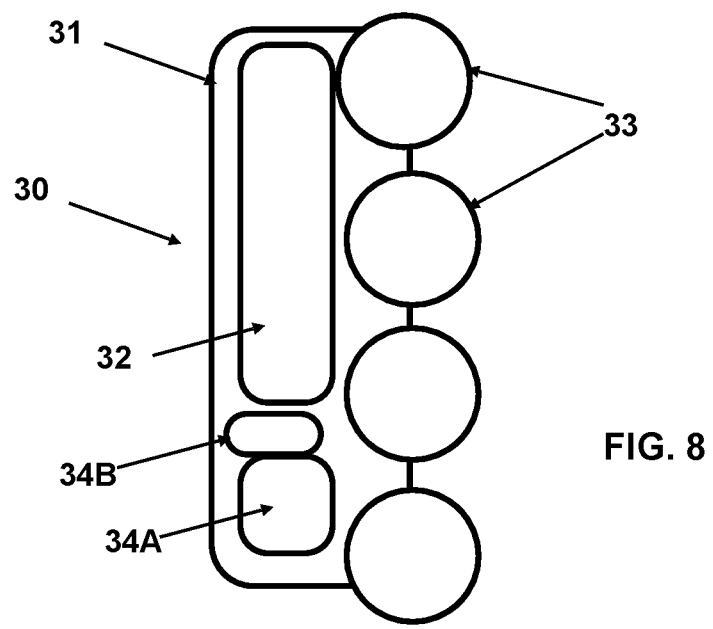
FIG. 8 is a side view of an embodiment of an illumination unit comprising multiple light emitters.

FIG. 8 shows a side view of a first embodiment of an illumination unit 30 configured to be worn by a vehicle operator or a passenger, for example on a helmet or on a garment such as a jacket or vest. The illumination unit 30 comprises a support frame or housing 31, a power supply 32, one or more light emitters 33, and a receiver 34. The embodiment in FIG. 8 shows four light emitters 33. Alternative embodiments may have one, two, three, five, or more light emitters. Light emitter 33 is preferably a LED and may be any light emitter capable of producing light with an intensity to be seen by the operator of a following vehicle. In a most preferred embodiment, the light emitter is a single high intensity LED with a horizontal angle of illumination of at least 90 degrees or more when worn by an operator or passenger of the vehicle or when reversibly mounted to the vehicle. It is preferable that the light emitter(s) produce a horizontal angle of illumination of at least 90 degrees per automotive lighting research and established automotive lighting standards.

The portable illumination unit 30 is shown in FIG. 6 as being located on a helmet on the head of the vehicle operator. The helmet may be worn by a passenger sitting behind the operator of the vehicle. The illumination unit 30 may be built into the helmet, in which case the helmet is a means for reversibly attaching the illumination unit 30 to the head of the vehicle operator or head of a passenger. In another embodiment the illumination module may be reversibly mounted to the helmet so that the helmet, together with the reversible mounting means, serve as a means for reversible attaching the illumination unit 30 to the vehicle operator or passenger. It is possible for an operator and/or a passenger to wear one or more illumination units 30,40. An illumination unit 30 comprising a helmet is preferably constructed such that the support frame or housing 31 is attached to the helmet so that the housing 31 is sheared from the helmet when subjected to a force equal to or greater than a predetermined force. This feature prevents an impact on the the frame or housing 31 from driving any portion of the frame or housing into the helmet in the event of a crash. Therefore the structural integrity of the helmet is preserved to offer the rider maximum protection.

Figure 9:
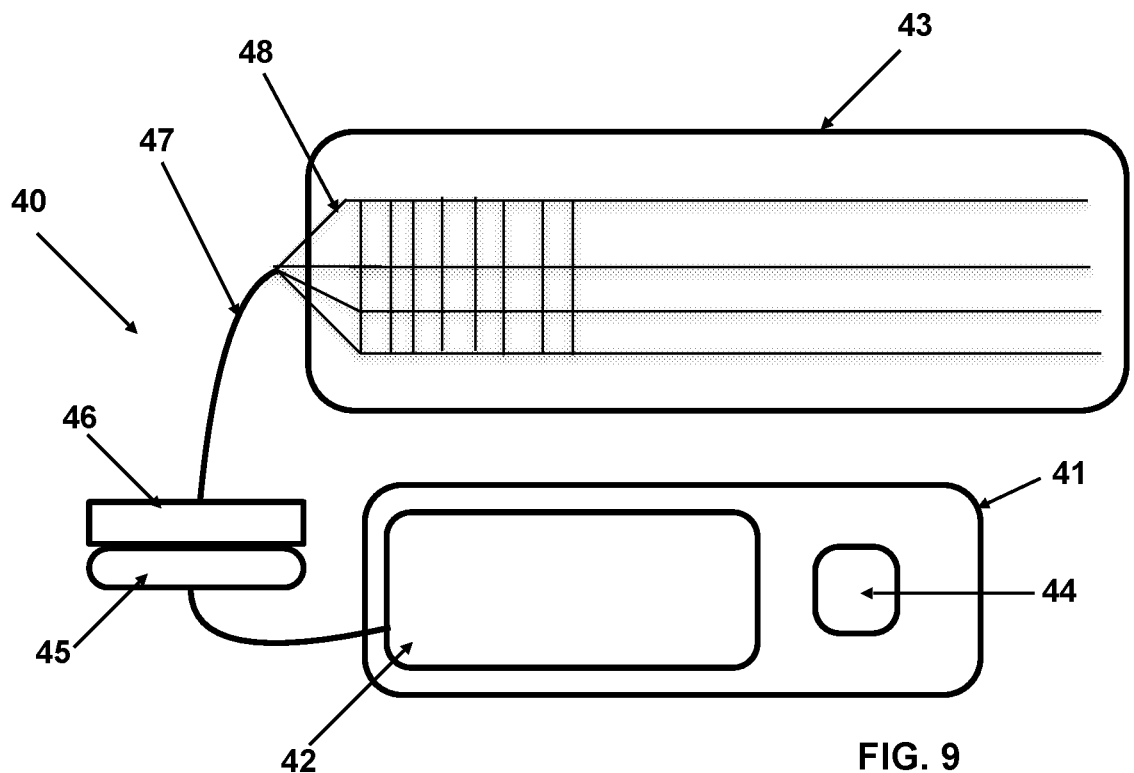
FIG. 9 is an illustration of an illumination unit comprising fiberoptic strands.

A second embodiment 40 of an illumination unit is shown in FIG. 9 comprising a housing or support frame 41 holding a power supply 42 and a receiver 44 as with the first embodiment shown in FIG. 7. As with the receiver 34a in FIG. 7, receiver 44 comprises a processor with control logic that instructs the power supply to activate one or more light emitters, in this case an array of LEDs 45, when a signal is received from the transmitter 14a of the sensor unit 10. The LED array 45 is shown as being outside the housing 41 and connected to the power supply 42. In alternative embodiments, the LED array 45 may be positioned on or inside the housing or support frame 41. In an alternative embodiment, the light source 45 may be a single LED. In another alternative embodiment, the light source 45 may be an incandescent, fluorescent, halogen, or other type of light bulb.

An illuminating fabric 43 comprises a rows or arrays of instead optical fibers 48 that may be woven, braided, or otherwise incorporated into or onto the illuminating fabric 43. In one embodiment, the illuminating fabric further comprises highly reflective material behind the optical fibers 48 to increase the luminosity of the fabric 43. Ends of the optical fibers 48 are held opposite LEDs of the LED array 45 such that ends of the fiberoptic strands are illuminated by the LEDs and light is conducted though the optical fibers and into the fabric. The size and shape of the illuminating fabric 43 may be variable but must be visible to operators of following vehicles when illuminated. This illuminated fabric may also be used, for example, in locations including the rear of the helmet and the back of the arms of jackets. An advantage of this technical feature is that it provides uniform illumination and increases the effective area of the indicator light. Another advantage is that the illuminating fabric is flexible and can move with the wearer.

Figure 10:
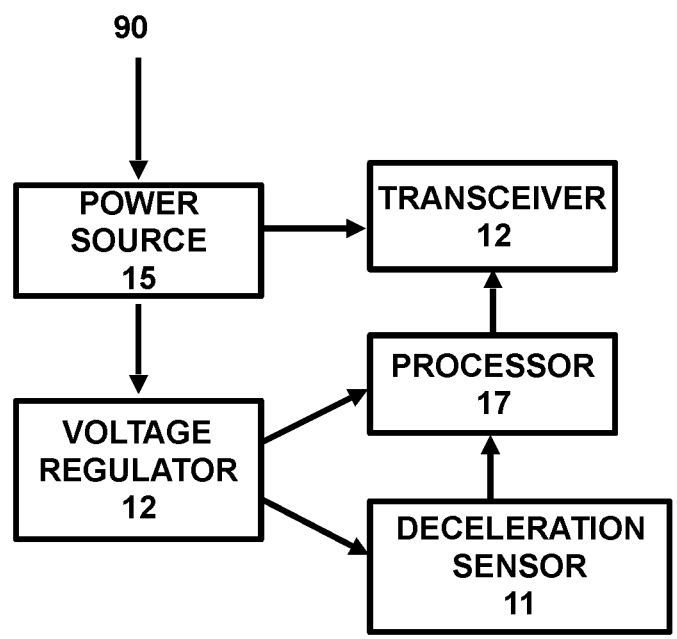
FIG. 10 presents a functional diagram of an exemplary sensor unit.

FIG. 10 presents a functional diagram of an exemplary sensor unit 10. Power source 15 provides power to deceleration sensor 11 and processor 17 via a voltage regulator 12 and also provides power to a transceiver 14 or, in a different embodiment, to a transmitter 14a. Deceleration sensor 11 provides timed acceleration data for each time t to processor 17.

For a deceleration sensor comprising an accelerometer, accelerometer data for each of three different axes is processed by the processor 17 to determine whether or not the combined acceleration values meet or exceed a threshold value. The threshold value may be variable according to a predetermined, or preprogrammed, algorithm.

For a deceleration sensor comprising a GPS module, acceleration values are calculated based on timed position and/or timed or velocity data. For example, ground speed can be extracted from the standard output of a GPS module and, using the microprocessor 17 or a microprocessor associated with the GPS module, deceleration values are calculated at time intervals and averages of a plurality of sequential calculated deceleration values are used to determine an average deceleration value that is compared to a threshold value. If the averaged deceleration value is higher than the threshold value, the microprocessor 17 instructs an indication unit to indicate deceleration.

Negative acceleration, or deceleration, is the decreasing rate of change of the velocity or speed. The deceleration sensor uses speed information in the National Marine Electronics Association (NMEA) sentence output from a GPS module and measures the rate of decreasing speed This measurement may be performed on the GPS module processor or microprocessor 17. Microprocessor 17 is configured to compare the measured deceleration to a threshold deceleration value and cause the illumination circuit to activate illumination of the brake lights if the threshold exceeded.

Additionally or alternatively, the microcontroller 17 may read time and position data from the NMEA sentences output of the GPS module and calculate speed and the time rate of change of speed to calculate deceleration. Calculating the deceleration for each time t, or timed deceleration values, may allow faster processing because fewer terms of the NMEA sentences are read and formatted for use in the deceleration sensor. The standard update rate of GPS modules used for navigation is 1 Hz or once per second and is insufficient for a deceleration sensor. An automatic deceleration indicator should illuminate within 300 milliseconds of the deceleration measurement with the 300 milliseconds being typical of a human response time. This would require at least a 3 Hz GPS module update rate. Update rates faster than 5 Hz provide a more accurate measurement of position and therefore facilitate a more accurate calculation of deceleration.

The frequency of measurements and the number of measurements averaged may vary between vehicle type and g-forces in axes orthogonal to the forward vector of motion. An advantage of this type of deceleration sensor over an accelerometer is that vibrations and traversal of rough surfaces are not detectable by GPS. Disadvantages associated with deceleration sensing by GPS rather than accelerometer include the potential loss of line of site to multiple satellites caused by tall buildings or tunnels.

The power source 15 may optionally be rechargeable and be recharged by an external power source 90 and/or harvesting kinematic energy that is transformed to electrical energy to recharge the power source. Such an energy harvesting device may use the movement of a magnet in an electromagnetic generator to generate power for recharging or a piezoelectric device stimulated to vibrate by road and/or engine vibrations. Additionally or alternatively, a thermoelectric generator comprising a junction of two dissimilar materials in the presence of a thermal gradient may be used to provide power for regeneration.

Certain embodiments have been described in the non-limiting context of a generic vehicle and a generic brake lamp. The generic vehicle may be any motorized vehicle such as an automobile, a truck, a tractor, a motorcycle, a snowmobile, or a watercraft. In other embodiments the vehicle may be a non-motorized vehicle such as a trailer designed to be pulled by, and electrically connected to, a motorized vehicle, a bicycle, or electric mobility vehicle.

The invention claimed is:

1. A sensor and control apparatus for modifying a vehicle lighting system comprising:
    a support frame supporting a deceleration sensor unit comprising a deceleration sensor, a power storage unit, and a microprocessor controller;
    means for attaching the support frame to a fixed element of the vehicle;
    a first electrical connector configured for connection to the vehicle's electrical system through an existing electrical connector configured for connection to a brake lamp;
    a second electrical connector configured for connection to a brake light of the vehicle;
    a charging circuit coupled to said first electrical connector and to an energy storage component and configured for conveying power diverted from the vehicle's electrical system to said energy storage component;
    a bypass circuit coupled to said first and second electrical connectors and configured to deliver power directly to said brake lamp when braking is indicated by the vehicle electrical system; and
    an illumination circuit coupled to the power storage unit and configured to provide electrical power through the second electrical connector to illuminate the brake lamp;
    wherein:
    the deceleration sensor unit comprises one or both of an accelerometer and a GPS sensor and said microprocessor controller comprises control logic configured to:
    calculate a timed deceleration value using data from the deceleration sensor unit;
    compare the timed deceleration value to a first threshold deceleration value; and
    if the timed deceleration value is higher than the first threshold value, energize the illumination circuit with energy from the power source and
    wherein the deceleration sensor unit comprises a GPS module and said microprocessor controller comprises control logic configured to:
    calculate a timed deceleration value from timed position and/or velocity data from the GPS module;
    compare the timed deceleration value to a first threshold deceleration value; and
    if the timed deceleration value is higher than the first threshold value, energize the illumination circuit with energy from the power source.

2. The sensor and control apparatus of claim 1, wherein the first threshold deceleration is variable and the microprocessor comprises software that varies the first threshold deceleration value depending on one or more of a measured velocity and a measured acceleration and wherein the measured velocity is in a direction of motion and/or in a direction normal to the direction of motion and the measured acceleration is in a direction normal to the direction of motion.

3. The sensor and control apparatus of claim 1, wherein said microprocessor controller comprises software to determine whether or not the timed deceleration value exceeds a second threshold and, if the second threshold value is exceeded, to repeatedly energize the illumination circuit with energy from the power source.

4. The sensor and control apparatus of claim 1, wherein:
the deceleration sensor unit further comprises an accelerometer that measures timed acceleration in three orthogonal axes and provides said timed acceleration values for in the form of a combined acceleration vector to the microprocessor and
the microprocessor is configured to determine whether or not the combined acceleration vector exceeds a first threshold for a combined vector value and, if the first threshold value is exceeded, to energize the illumination circuit with energy from the power source.

5. The sensor and control apparatus of claim 4, wherein the microprocessor comprises software that fuses data from the GPS module and the accelerometer so that the timed deceleration value is a fused deceleration value.

6. The sensor and control apparatus of claim 1, wherein said deceleration sensor unit comprises an accelerometer that measures timed acceleration in three orthogonal axes and provides said timed acceleration values for in the form of a combined acceleration vector to the microprocessor and
the microprocessor is configured to determine whether or not the combined acceleration vector exceeds a first threshold for a combined vector value and, if the first threshold value is exceeded, to energize the illumination circuit with energy from the power source.

7. The sensor and control apparatus of claim 1, further comprising a transmitter configured to transmit a signal when the illumination circuit is activated.

8. A sensor and control system comprising the sensor and control apparatus of claim 1, a transmitter configured to transmit a signal when the illumination circuit is activated, and a feedback display comprising a receiver that receives the signal from the transmitter and a feedback indicator that illuminates when said signal is received.

9. A portable deceleration warning system comprising:
a portable sensor unit comprising one or both of an accelerometer and a GPS module, means for reversibly mounting the sensor unit to a vehicle, a transmitter, a power supply, and a microprocessor;
a first portable illumination unit comprising a light emitter, a receiver, a power supply, and at least one of: means for reversible attachment to the vehicle and means for reversible attachment to an operator or passenger of the vehicle
wherein:
the portable sensor unit measures timed velocity and timed acceleration values of the vehicle;
the microprocessor is configured to determine whether a timed acceleration value exceeds a first threshold and, if the first threshold value is exceeded, to cause the transmitter to send a first signal to the receiver to energize the light emitter;
the portable sensor unit is configured for attachment to the vehicle;
the first threshold deceleration is variable and the microprocessor comprises software that varies the first threshold deceleration value depending on one or more of a measured velocity and a measured acceleration and wherein the measured velocity is in a direction of motion and/or in a direction normal to the direction of motion and the measured acceleration is in a direction normal to the direction of motion.

10. The portable deceleration warning system of claim 9, wherein the portable sensor unit comprises a GPS module and the microprocessor is configured receive GPS data comprising timed position and/or velocity data and calculate the timed acceleration values from the GPS data.

11. The portable deceleration warning system of claim 9, further comprising auxiliary illuminated fabric patches located on the front, sides, and rear of the operator and wherein:
said microprocessor controller comprises software to determine whether or not the timed deceleration value exceeds a second threshold and, if the second threshold value is exceeded, to cause the transmitter to send a second signal and
the auxiliary illuminated fabric patches illuminate in response to the second signal.

12. The portable deceleration warning system of claim 11, wherein the illumination unit further comprises a means for receiving input from a user and said receiver comprises control logic to de-energize the light emitter in response to an input from a user.

13. The portable deceleration warning system of claim 9, further comprising a second portable illumination unit comprising a light emitter, a receiver, a power supply, and at least one of: means for reversible attachment to the vehicle and means for reversible attachment to an operator or passenger of the vehicle and wherein the microprocessor is configured to cause the transmitter to send the first signal to the receiver of the second portable illumination unit and to energize the light emitter of the second portable illumination unit.

14. The portable deceleration warning system of claim 9, wherein said light emitter comprises an array of light emitting diodes (LEDs) and an array of optical fibers and wherein ends of said array of optical fibers are aligned with LEDs of said array of LEDs.

15. The portable deceleration warning system of claim 9, wherein the portable sensor unit comprises a GPS module, the microprocessor is configured to receive GPS data comprising timed position and/or velocity data and calculate timed deceleration values from the GPS data, and the microprocessor is configured to send the first signal to the receiver of the first portable illumination unit and to energize the light emitter of the second portable illumination unit if a timed deceleration value exceeds the first threshold value.

16. The portable deceleration warning system of claim 15, wherein the portable sensor unit further comprises an accelerometer that measures timed acceleration in three orthogonal axes and provides said timed acceleration values for in the form of a combined acceleration vector to the microprocessor and
the microprocessor is configured to determine whether or not the combined acceleration vector exceeds a first threshold for a combined vector value and, if the first threshold value is exceeded, to energize the illumination circuit with energy from the power source.

17. The portable deceleration warning system of claim 16, wherein the microprocessor comprises software that fuses data from the GPS module and the accelerometer so that the timed deceleration value is a fused deceleration value.

* * * * *